United States Patent
Zhang et al.

(10) Patent No.: US 9,065,617 B2
(45) Date of Patent: Jun. 23, 2015

(54) MIMO RELATED SIGNALING IN WIRELESS COMMUNICATION

(75) Inventors: Xiaoxia Zhang, San Diego, CA (US); Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 12/853,071

(22) Filed: Aug. 9, 2010

(65) Prior Publication Data

US 2011/0188587 A1 Aug. 4, 2011

Related U.S. Application Data

(60) Provisional application No. 61/234,601, filed on Aug. 17, 2009.

(51) Int. Cl.
*H04L 5/00* (2006.01)

(52) U.S. Cl.
CPC ............. *H04L 5/0053* (2013.01); *H04L 5/0023* (2013.01)

(58) Field of Classification Search
None
See application file for complete search history.

(56) References Cited

U.S. PATENT DOCUMENTS

| | | | | |
|---|---|---|---|---|
| 2010/0080154 A1* | 4/2010 | Noh et al. | | 370/310 |
| 2010/0254268 A1* | 10/2010 | Kim et al. | | 370/241 |
| 2011/0268072 A1* | 11/2011 | Lee et al. | | 370/329 |
| 2011/0274205 A1* | 11/2011 | Lee et al. | | 375/295 |
| 2012/0002740 A1* | 1/2012 | Han et al. | | 375/260 |
| 2012/0008587 A1* | 1/2012 | Lee et al. | | 370/329 |
| 2012/0039287 A1* | 2/2012 | Ko et al. | | 370/329 |
| 2012/0039298 A1* | 2/2012 | Lee et al. | | 370/330 |
| 2012/0114021 A1* | 5/2012 | Chung et al. | | 375/211 |
| 2013/0242926 A1* | 9/2013 | Prasad et al. | | 370/329 |
| 2014/0226617 A1* | 8/2014 | Chung et al. | | 370/330 |

OTHER PUBLICATIONS

International Search Report and Written Opinion—PCT/US2010/045783—International Search Authority, European Patent Office,Feb. 4, 2011.
NTT DOCOMO: "DL DM-RS Design for LTE-Advanced", 3GPP Draft; R1-092798 DL DMRS for LTE-A, 3rd Generation Partnership Project (3GPP), Mobile Competence Centre ; 650, Route Des Lucioles ; F-06921 Sophia-Antipolis Cedex ; France, No. Los Angeles, USA; Jun. 24, 2009, XP050351252, [retrieved on Jun. 24, 2009].
Research in Motion et al: "Control Signal Design for Rel-9 Dual-layer BF Transmission", 3GPP Draft; R1-092412(RIM-Control Signaling Design for Dual-Layer BF), 3rd Generation Partnership Project (3GPP), Mobile Competence Centre ; 650, Route Des Lucioles ; F-06921 Sophia-Antipolis Cedex ; France, no. Los Angeles, USA; Jun. 24, 2009, XP050350926, [retrieved on Jun. 24, 2009].
Taiwan Search Report—TW099127481—TIPO—Apr. 25, 2013.

(Continued)

*Primary Examiner* — Eunsook Choi
(74) *Attorney, Agent, or Firm* — Liem T. Do

(57) ABSTRACT

Certain aspects of the present disclosure relate to techniques for multiple-input multiple-output (MIMO) related signaling in a wireless communication system. In an aspect, a method for wireless communication is provided which includes receiving a signal associated with a downlink control channel, the signal including information specific to a user equipment (UE); and selecting, based on the information, a UE-specific reference signal (RS) pattern from a plurality of UE-specific RS patterns.

20 Claims, 5 Drawing Sheets

(56) References Cited

OTHER PUBLICATIONS

Qualcomm Europe, "Downlink RS structure in support of higher-order MIMO", 3GPP TSG-RAN WG1 #57, R1-092050, May 4-8, 2009, San Francisco, USA.

Huawei, "Downlink control signaling for dual-layer beamforming", 3GPP TSG-RAN-WG1 Meeting #57bis, R1-092360, Los Angeles, USA, Jun. 29-Jul. 3, 2009.

Nortel, "Uplink Adaptive Transmission with TP" [online], 3GPP TSG-RAN WG1#45, Shanghai, China, R1-061235, <URL:http://www.3gpp.org/ftp/tsg_ran/WG1_RL1/TSGR1_45/Docs/R1-061235.zip>,May 8, 2006, pp. 1-5.

Texas Instruments, "Views on Cell Search and SCH Design" [online], 3GPP TSG-RAN WG1#48bis, St. Julian's, Malta, R1-071467, <URL:http://www.3gpp.org/ftp/tsg_ran/WG1_RL1/TSGR1_48b/Docs/R1-071467.zip>, Mar. 26, 2007.

* cited by examiner

MIMO RELATED SIGNALING IN WIRELESS COMMUNICATION

CLAIM OF PRIORITY UNDER 35 U.S.C. §119

The present application for Patent claims benefit of U.S. Provisional Patent Application No. 61/234,601, entitled, "MIMO related signaling in LTE-A," filed Aug. 17, 2009, and assigned to the assignee hereof and hereby expressly incorporated by reference herein.

BACKGROUND

1. Field

Certain aspects of the present disclosure generally relate to wireless communications and, more particularly, to a method for multiple-input multiple-output (MIMO) related signaling in wireless communication systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes receiving, by a user equipment (UE), a signal associated with a downlink control channel, wherein the signal comprises information specific to the UE, and selecting, based on the information, a UE-specific reference signal (RS) pattern from a plurality of UE-specific RS patterns.

Certain aspects of the present disclosure provide an apparatus for wireless communications. The apparatus generally includes means for receiving a signal associated with a downlink control channel, wherein the signal comprises information specific to the apparatus, and means for selecting, based on the information, a user-specific reference signal (RS) pattern from a plurality of user-specific RS patterns.

Certain aspects of the present disclosure provide an apparatus for wireless communications. The apparatus generally includes a receiver configured to receive a signal associated with a downlink control channel, wherein the signal comprises information specific to the apparatus, and a circuit configured to select, based on the information, a user-specific reference signal (RS) pattern from a plurality of user-specific RS patterns.

Certain aspects of the present disclosure provide a computer-program product for wireless communications comprising a computer readable medium having instructions stored thereon, the instructions being executable by one or more processors. The instructions generally include instructions for receiving, by a user equipment (UE), a signal associated with a downlink control channel, wherein the signal comprises information specific to the UE, and instructions for selecting, based on the information, a UE-specific reference signal (RS) pattern from a plurality of UE-specific RS patterns.

Certain aspects of the present disclosure provide an apparatus for wireless communications. The apparatus generally includes at least one processor configured to receive a signal associated with a downlink control channel, wherein the signal comprises information specific to the apparatus, and select, based on the information, a user-specific reference signal (RS) pattern from a plurality of user-specific RS patterns, and a memory coupled to the at least one processor.

Certain aspects of the present disclosure provide a method for wireless communications. The method generally includes receiving, at a user equipment (UE), a signal comprising a reference signal (RS), wherein the RS is associated with a specific pseudo-noise (PN) sequence, performing blind decoding of the RS using a plurality of PN sequences, and determining, based on results of the blind decoding, a UE-specific RS pattern from a plurality of UE-specific RS patterns.

Certain aspects of the present disclosure provide an apparatus for wireless communications. The apparatus generally includes means for receiving a signal comprising a reference signal (RS), wherein the RS is associated with a specific pseudo-noise (PN) sequence, means for performing blind decoding of the RS using a plurality of PN sequences, and means for determining, based on results of the blind decoding, a user-specific RS pattern from a plurality of user-specific RS patterns.

Certain aspects of the present disclosure provide an apparatus for wireless communications. The apparatus generally includes a receiver configured to receive a signal comprising a reference signal (RS), wherein the RS is associated with a specific pseudo-noise (PN) sequence, a decoder configured to perform blind decoding of the RS using a plurality of PN sequences, and a circuit configured to determine, based on results of the blind decoding, a user-specific RS pattern from a plurality of user-specific RS patterns.

Certain aspects of the present disclosure provide a computer-program product for wireless communications comprising a computer readable medium having instructions stored thereon, the instructions being executable by one or more processors. The instructions generally include instructions for receiving, at a user equipment (UE), a signal comprising a reference signal (RS), wherein the RS is associated with a specific pseudo-noise (PN) sequence, instructions for performing blind decoding of the RS using a plurality of PN sequences, and instructions for determining, based on results of the blind decoding, a UE-specific RS pattern from a plurality of UE-specific RS patterns.

Certain aspects of the present disclosure provide an apparatus for wireless communications. The apparatus generally includes at least one processor configured to receive a signal comprising a reference signal (RS), wherein the RS is associated with a specific pseudo-noise (PN) sequence, perform blind decoding of the RS using a plurality of PN sequences, and determine, based on results of the blind decoding, a user-specific RS pattern from a plurality of user-specific RS patterns, and a memory coupled to the at least one processor.

Certain aspects of the present disclosure provide a method for wireless communications. The method generally includes generating a reference signal (RS) pattern, wherein the RS pattern comprises a pseudo-noise (PN) sequence specific for a rank of a user equipment (UE), and transmitting the RS pattern to the UE.

Certain aspects of the present disclosure provide an apparatus for wireless communications. The apparatus generally includes means for generating a reference signal (RS) pattern, wherein the RS pattern comprises a pseudo-noise (PN) sequence specific for a rank of a user equipment (UE), and transmitting the RS pattern to the UE.

Certain aspects of the present disclosure provide an apparatus for wireless communications. The apparatus generally includes a circuit configured to generate a reference signal (RS) pattern, wherein the RS pattern comprises a pseudo-noise (PN) sequence specific for a rank of a user equipment (UE), and a transmitter configured to transmit the RS pattern to the UE.

Certain aspects of the present disclosure provide a computer-program product for wireless communications comprising a computer readable medium having instructions stored thereon, the instructions being executable by one or more processors. The instructions generally include instructions for generating a reference signal (RS) pattern, wherein the RS pattern comprises a pseudo-noise (PN) sequence specific for a rank of a user equipment (UE), and instructions for transmitting the RS pattern to the UE.

Certain aspects of the present disclosure provide an apparatus for wireless communications. The apparatus generally includes at least one processor configured to generate a reference signal (RS) pattern, wherein the RS pattern comprises a pseudo-noise (PN) sequence specific for a rank of a user equipment (UE), and transmit the RS pattern to the UE, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
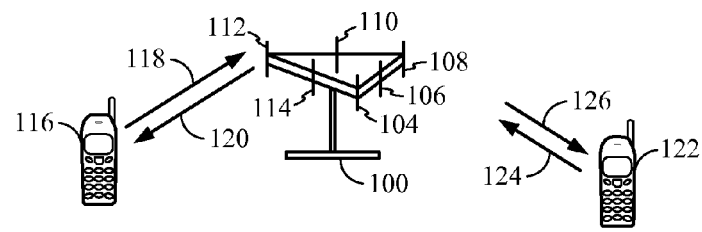
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are an upcoming releases of UMTS that use E-UTRA. UTRA, E-UTRA, GSM, UMTS, LTE and LTE-A are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE-A, and LTE-A terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE, LTE-A, and the Evolved UTRA.

An access point ("AP") may comprise, be implemented as, or known as Node B, evolved Node B ("eNode B"), Radio Network Controller ("RNC"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
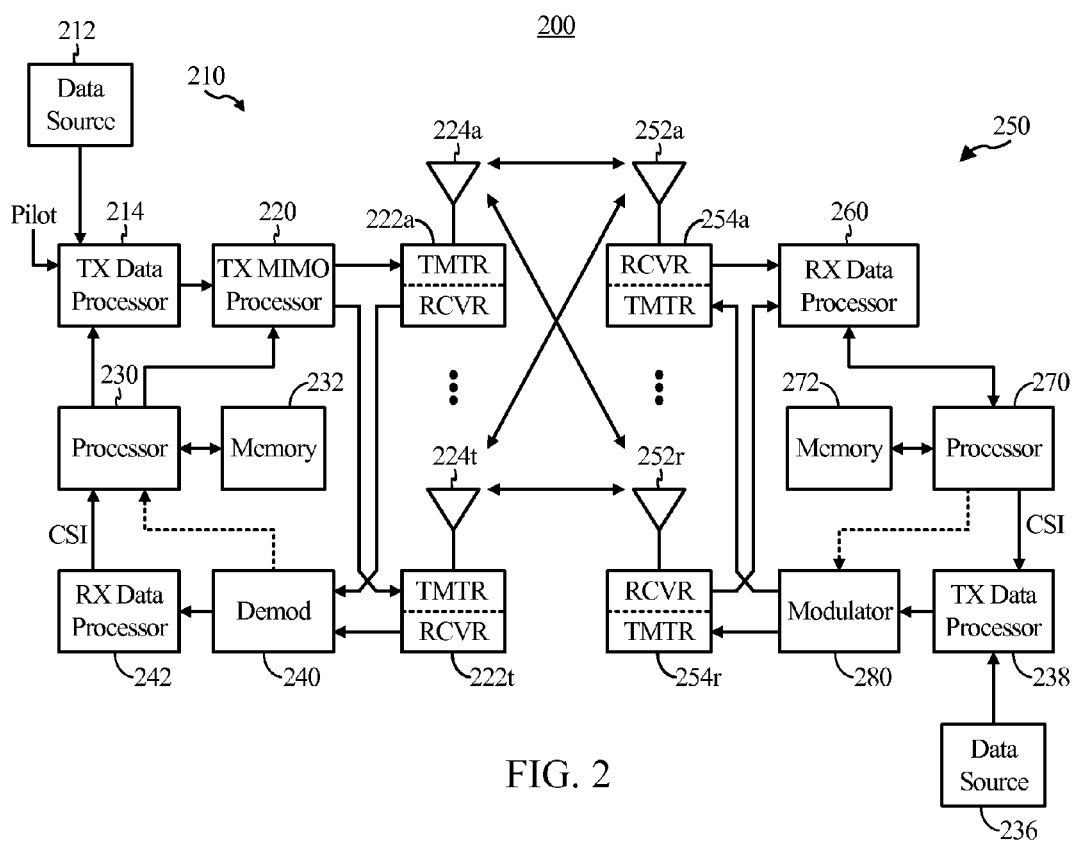
FIG. 2 illustrates a block diagram of an access point and a user terminal in accordance with certain aspects of the present disclosure.

FIG. 2 illustrates a block diagram of an aspect of a transmitter system 210 (e.g., access point) and a receiver system 250 (e.g., access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters (TMTR) 254a through 254r, and transmitted back to transmitter system 210.

At transmitter system 210, the modulated signals from receiver system 250 are received by antennas 224, conditioned by receivers (RCVR) 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels comprise: Physical Downlink Shared Channel (PDSCH), Physical Broadcast Channel (PBSH), Physical Multicast Channel (PMCH), Physical Downlink Control Channel (PDCCH), Physical Hybrid Automatic Repeat Request Indicator Channel (PHICH), and Physical Control Format Indicator Channel (PCFICH).

The UL PHY Channels comprise: Physical Random Access Channel (PRACH), Physical Uplink Shared Channel (PUSCH), and Physical Uplink Control Channel (PUCCH).

In an aspect, a channel structure is provided that preserves low PAR (at any given time, the channel is contiguous or uniformly spaced in frequency) properties of a single carrier waveform.

In LTE Release-8 wireless communications standard (or simply "Rel-8"), only rank 1 may be supported for multi-user multiple-input multiple-output (MU-MIMO) wireless systems, such as the system illustrated in FIG. 1. A feedback from a user equipment (UE) (e.g., from the UE 116 or UE 122) may be identical as for a rank 1 single user MIMO (SU-MIMO) system. A downlink (DL) grant may signal a precoding vector to the UE, while companion user information may not be signaled.

The DL transmission of cell-specific reference signal (CRS) is supported by Rel-8. Each UE of the MU-MIMO system may obtain a precoded channel estimate from the CRS. The precoding vector may be signaled in a Physical Downlink Control Channel (PDCCH).

In LTE-A Release-10, UE-specific reference signal (RS) may be utilized for demodulation. A different rank may be potentially associated with different UE-specific RS patterns in order to reduce RS overhead. In the case of SU-MIMO, a rank signaled in the PDCCH for the UE may uniquely determine the UE-specific RS pattern. However, rank information only for a target UE may not be sufficient in the case of MU-MIMO.

MIMO Signaling in LTE-A

Figure 3:
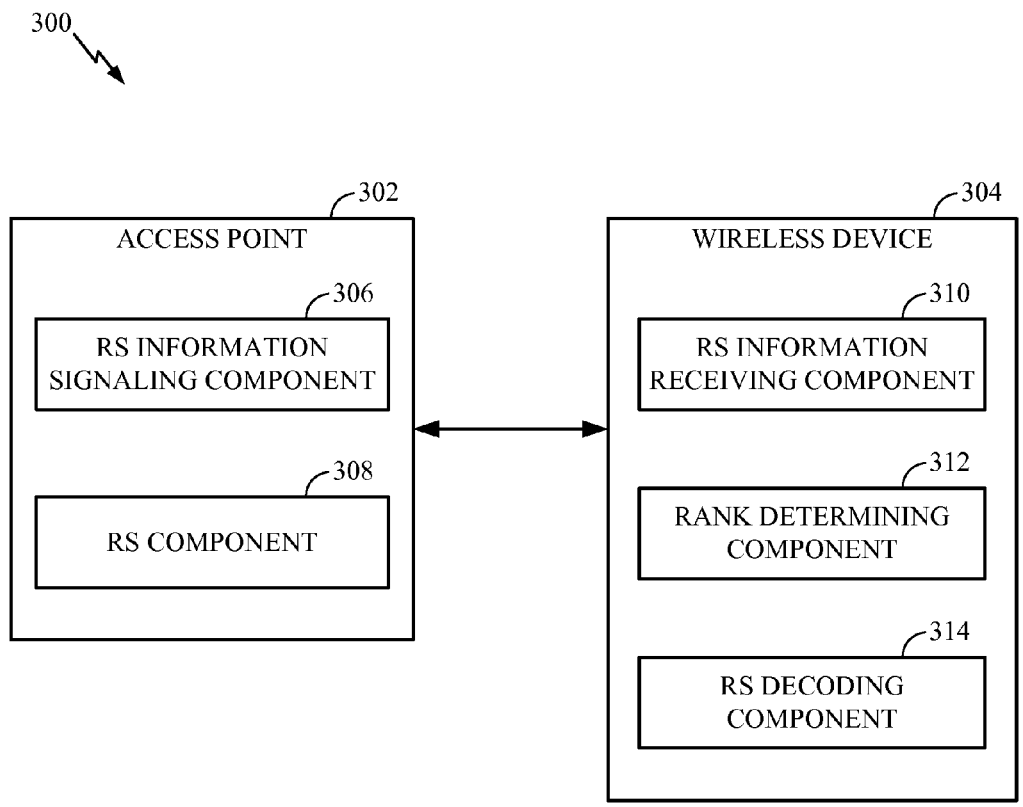
FIG. 3 illustrates an example system that facilitates communicating reference signals (RSs) in accordance with certain aspects of the present disclosure.

FIG. 3 illustrates a system 300 that facilitates communicating rank dependent user equipment specific reference signals (UE-specific RSs) in a multi-user multiple-input multiple-output (MU-MIMO) configuration. The system 300 may comprise an access point 302 that may be a base station, eNode B, femtocell access point, picocell access point, relay node, mobile base station, mobile device operating in a peer-to-peer communications mode, and/or the like, for example, that provides a wireless device 304 with access to a wireless network. The wireless device 304 may be a mobile device, user equipment (UE), portion thereof, or substantially any device that can receive access to a wireless network.

The access point 302 may comprise an RS information signaling component 306 that may provide parameters regarding RS transmissions (e.g., over a PDCCH) and an RS component 308 that may transmit reference signals to one or more wireless devices. The wireless device 304 may comprise an RS information receiving component 310 that may obtain one or more parameters related to RS transmissions from the access point, a rank determining component 312 that may receive a rank related to the wireless device 304, and an RS decoding component 314 that may decode one or more RSs based at least in part on the rank.

According to an example, as described, UE-specific demodulation RSs between spatial users may be based on Code Division Multiplexing (CDM), Frequency Division Multiplexing (FDM), or on a combination thereof. Simple spatial separation for RS may suffer from severe channel estimation loss.

In one aspect, when UE-specific RSs are based on the CDM, the access point 302 may multiplex RSs according to Walsh codes selected for one or more wireless devices, and the Walsh codes may be linked to each layer relating to rank. In this case, the RS information signaling component 306 may signal the Walsh codes (and/or the spanned layers) related to the wireless device 304 over the PDCCH. The RS component 308 may transmit the RSs multiplexed according to the Walsh codes. It should be noted that a number of Walsh codes/spanned layers may indicate the rank of wireless device 304.

The RS information receiving component 310 may obtain the Walsh codes (or an indication about a number of spanned layers) from the access point 302. The rank determining component 312 may discern the rank of wireless device 304 based on the number of Walsh codes (or the number of spanned layers) signaled from the RS information signaling component 306. The RS decoding component 314 may decode one or more RSs specific to the wireless device 304 based on the rank of wireless device 304. For example, the RS decoding component 314 may decode the RSs at the multiple layers based on the rank and using the received Walsh codes (or indication about spanned layers).

In addition, the wireless device 304 may determine its specific RS pattern depending on a total rank of all wireless devices served by the access point 302, if a different pattern is used for a different rank. In one aspect, the RS information signaling component 306 may signal over PDCCH the UE-specific RS pattern to the wireless device 304. The RS information receiving component 310 may obtain the RS pattern, and the RS decoding component 314 may decode the RS according to the pattern.

In another aspect, the RS information signaling component 306 may signal over PDCCH to the wireless device 304 a total rank of companion UEs (other wireless devices) or a total rank of all UEs served by the access point 302. The RS information receiving component 310 may obtain this information, and the RS decoding component 314 may determine the UE-specific RS pattern according to the information. For example, a logic for matching the UE-specific RS pattern based on the total rank of companion UEs or the total rank of all served UEs may be implemented in the wireless device 304 based on hardcoding, a configuration, and/or the like. Once the UE-specific RS pattern is determined, data may be rate-matched around the UE-specific RS pattern.

In another aspect, where UE-specific RSs are based on Frequency Division Multiplexing (FDM), the access point 302 may multiplex RSs according to different time and/or frequency locations within the frequency band and the time/frequency locations may be linked to each layer relating to a rank of wireless device. The RS information signaling component 306 may signal over PDCCH the spanned layers to the wireless device 304. The number of spanned layers may indicate the rank of wireless device 304. The RS component 308 may transmit the RSs multiplexed according to the time/frequency RS locations.

The RS information receiving component 310 may obtain the indication about spanned layers from the access point 302. The rank determining component 312 may discern the rank of the wireless device 304 based on the number of spanned layers signaled from the RS information signaling component 306. The RS decoding component 314 may decode RSs specific to the wireless device 304 based on the rank.

In addition, the wireless device 304 may determine its specific RS pattern depending on a total rank of all wireless devices served by the access point 302, if a different RS pattern is used for a different rank. In one aspect, the RS information signaling component 306 may signal over PDCCH the UE-specific RS pattern to the wireless device 304. The RS information receiving component 310 may obtain the RS pattern, and the RS decoding component 314 may decode the RS according to the pattern.

In another aspect, the RS information signaling component 306 may signal over PDCCH to the wireless device 304 a total rank of companion UEs (wireless devices) or a total rank of all UEs served by the access point 302. The RS information receiving component 310 may obtain this information, and the RS decoding component 314 may determine the UE-specific RS pattern according to the information. For example, a logic for matching the UE-specific RS pattern based on the total rank of companion UEs or the total rank of all served UEs may be implemented in the wireless device 304 based on hardcoding, a configuration, and/or the like. Once the UE-specific RS pattern is determined, data may be rate-matched around the UE-specific RS pattern.

Though the concepts above are described with respect to MU-MIMO communications, it is to be appreciated that the access point 302 may be able to dynamically switch between MU-MIMO and single user MIMO (SU-MIMO) modes. Such signaling may be required even with SU-MIMO. Additionally or alternatively, the RS information signaling component 306 may signal over PDCCH whether the wireless device 304 is in SU-MIMO or MU-MIMO mode.

If the wireless device 304 is in the SU-MIMO mode, then only rank information may be required to determine a UE-specific RS pattern. On the other hand, if the wireless device 304 is in the MU-MIMO mode, then indication about spanned layers may be required in addition to the UE-specific RS pattern. The indication about SU-MIMO and MU-MIMO modes may be signaled to the wireless device 304 by using different PDCCH format for SU-MIMO and MU-MIMO.

Figure 4:
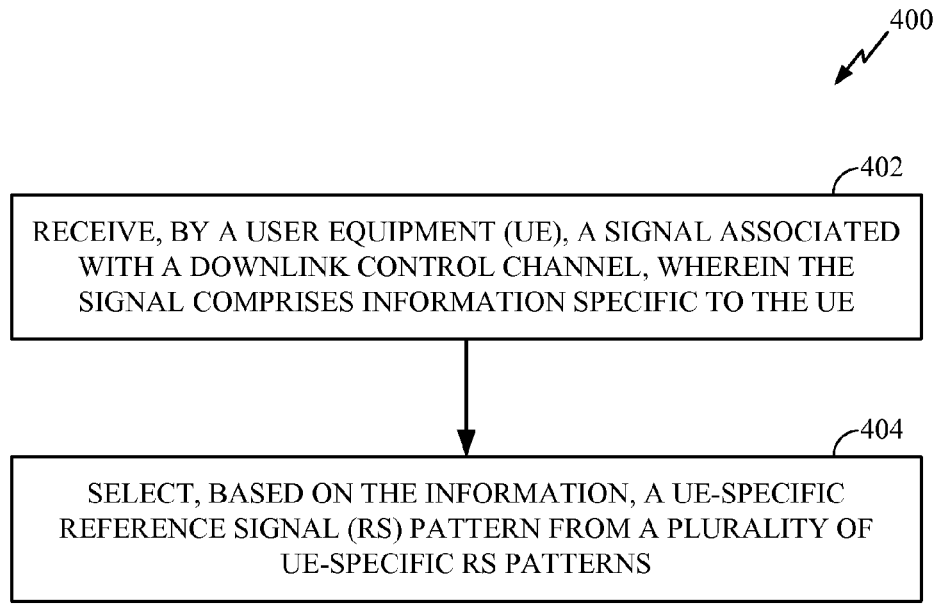
FIG. 4 illustrates example operations that may be performed at a user equipment (UE) for determining a UE-specific reference signal (RS) pattern in accordance with certain aspects of the present disclosure.

FIG. 4 illustrates example operations 400 that may be performed at a UE (e.g., at the wireless device 304) for determining UE-specific RS pattern in accordance with certain aspects of the present disclosure. At 402, the UE may receive a signal associated with a downlink control channel, wherein the signal may comprise information specific to the UE. At 404, the UE may select, based on the information, a UE-specific RS pattern from a plurality of UE-specific RS patterns. The selected UE-specific RS pattern may indicate what resources are used for transmission of reference signals and what resources are used for transmission of data symbols.

In yet another aspect of the present disclosure, the RS decoding component 314 may perform blind decoding on one or more signals from the access point 302 in order to determine a UE-specific RS pattern. Further, by performing blind decoding, the RS decoding component 314 may determine layers spanned by the wireless device 304 in order to obtain Walsh codes or time/frequency location of its own UE-specific RS.

The RS pattern specific to the wireless device 304 may comprise a pseudo-noise (PN) sequence specific for a rank of the wireless device. A different RS pattern may comprise a different PN sequence, and a different layer may be associated with a different PN sequence. In addition, a PN sequence may be related to a Resource Block (RB) index and/or RB allocations.

At the wireless device 304, the RS decoding component 314 may correlate a received RS with different PN sequence hypotheses. The largest correlation result may indicate the RS pattern specific to the rank of wireless device. Further, the RS decoding component 314 may correlate another received RS with different PN sequence hypotheses, wherein the other RS may comprise a different PN sequence for a different layer. The largest correlation result may indicate the layers spanned by the wireless device 304.

Figure 5:
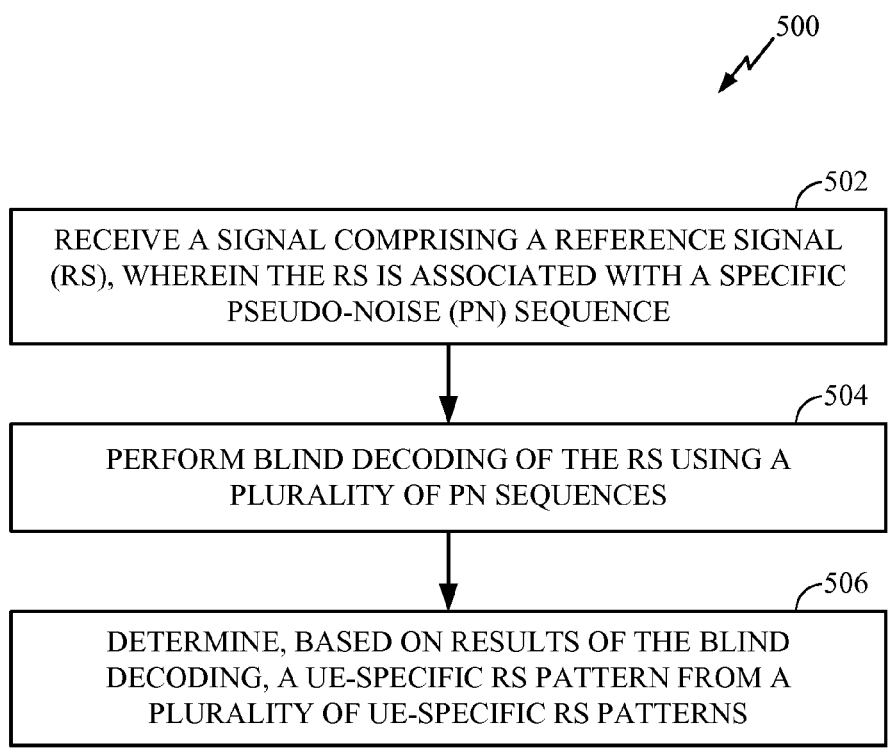
FIG. 5 illustrates example operations that may be performed at a UE for blind decoding of a UE-specific RS pattern in accordance with certain aspects of the present disclosure.

FIG. 5 illustrates example operations 500 that may be performed at a UE (e.g., the wireless device 304) for blind decoding of a UE-specific RS pattern in accordance with certain aspects of the present disclosure. At 502, the UE may receive a signal comprising a reference signal (RS), wherein the RS may be associated with a specific PN sequence. At 504, the UE may perform blind decoding of the RS using a plurality of PN sequences. At 506, the UE may determine, based on results of the blind decoding, a UE-specific RS pattern from a plurality of UE-specific RS patterns. Further, the UE may perform another blind decoding on the received signal using another plurality of PN sequences. The UE may determine, based on results of the other blind decoding, a number of layers spanned by the UE.

Figure 6:
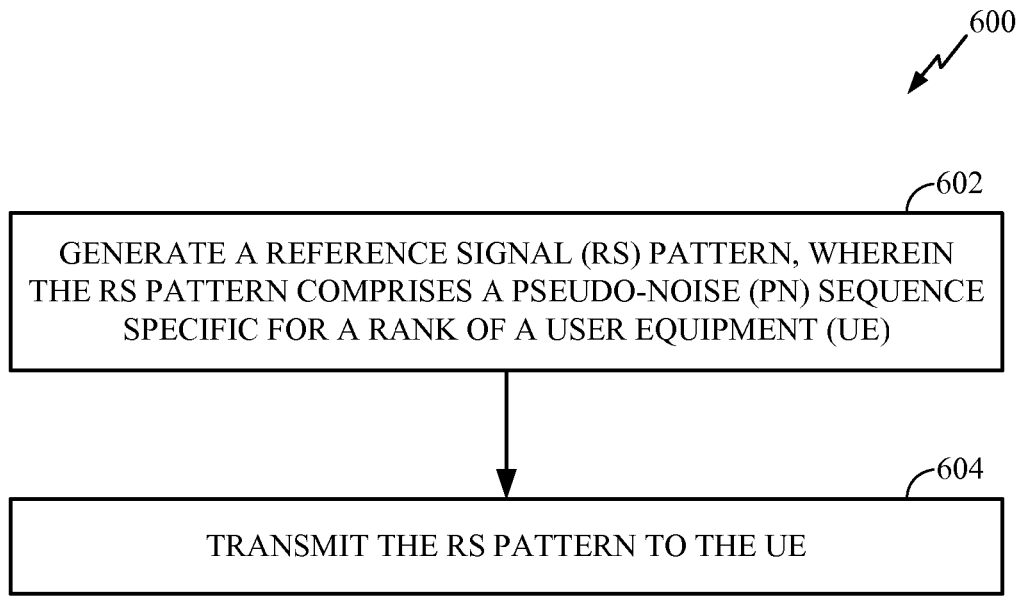
FIG. 6 illustrates example operations for generating an RS pattern that may be performed at an access point in accordance with certain aspects of the present disclosure.

FIG. 6 illustrates example operations 600 that may be performed at an access point (e.g., the access point 302) for generating an RS pattern in accordance with certain aspects of the present disclosure. At 602, the access point may generate the RS pattern, wherein the RS pattern may comprises a PN sequence specific for a rank of a UE (e.g., of the wireless device 304). At 604, the access point may transmit the RS pattern to the UE. The RS pattern may comprise one or more PN sequences, and each of the PN sequences may be associated with a different layer of the UE.

Figure 4A:
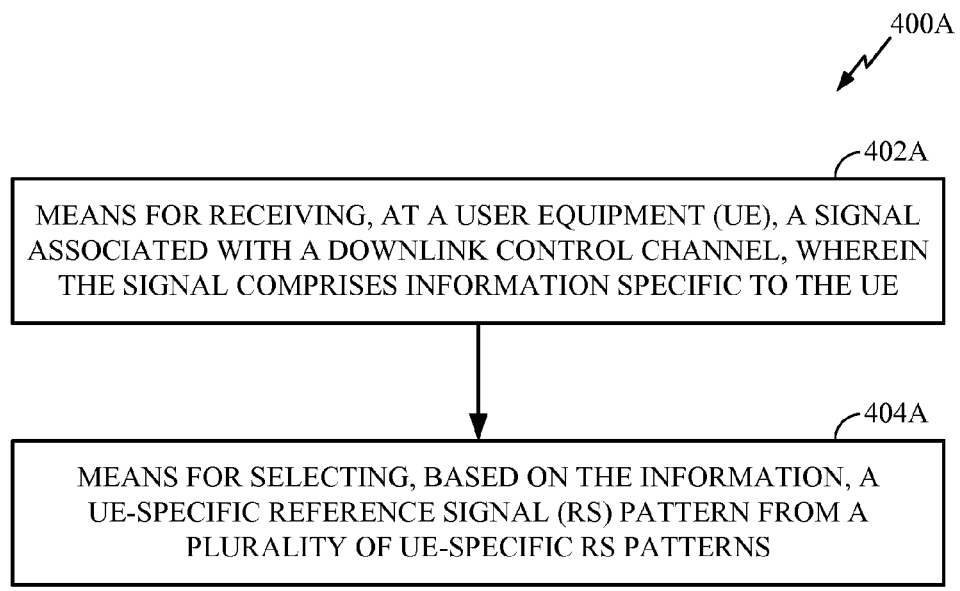
FIG. 4A illustrates example components capable of performing the operations illustrated in FIG. 4.
Figure 5A:
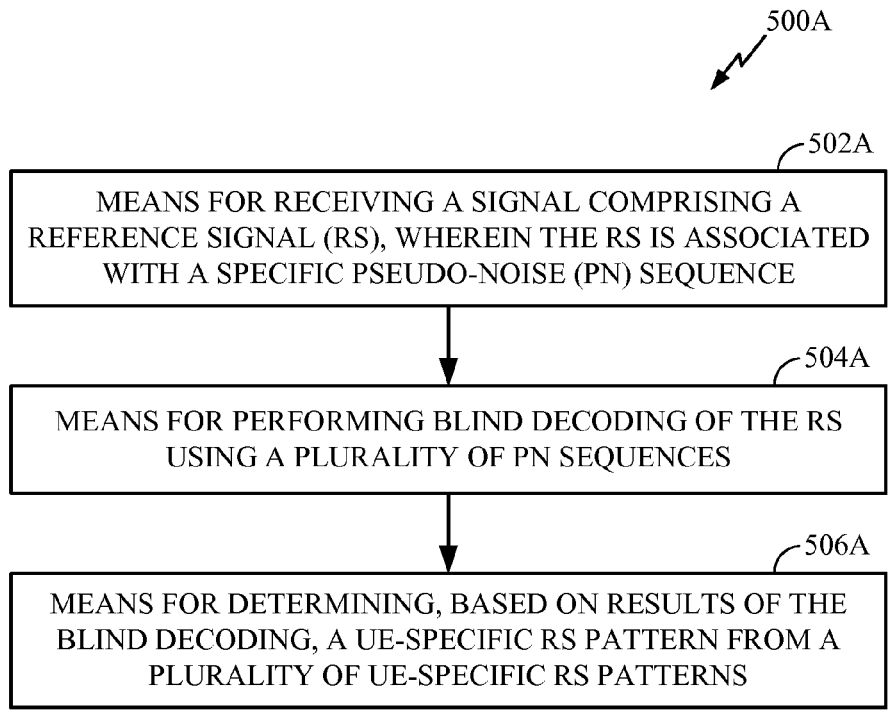
FIG. 5A illustrates example components capable of performing the operations illustrated in FIG. 5.
Figure 6A:
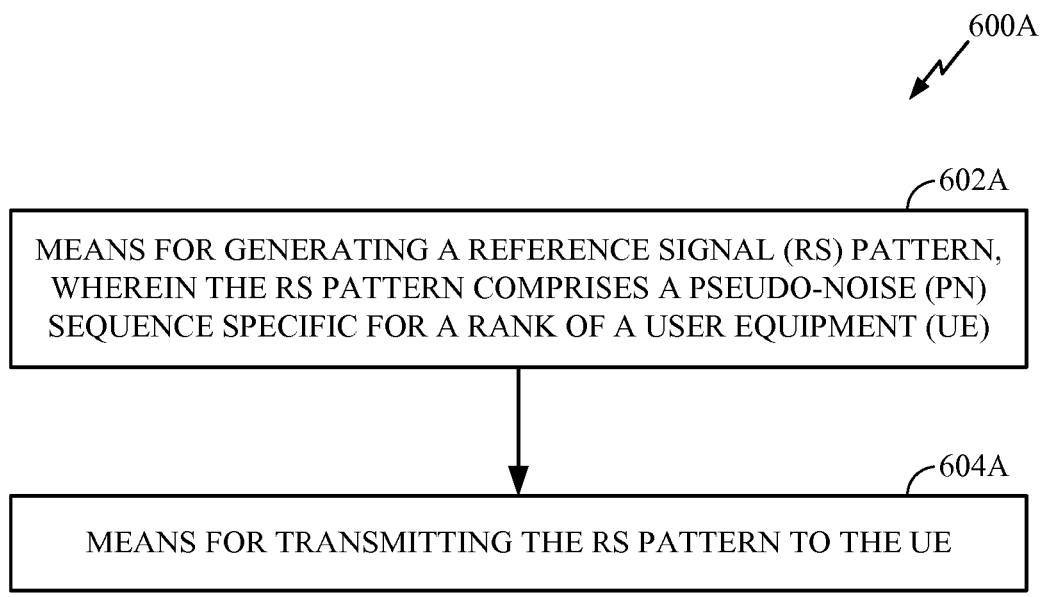
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 400, 500 and 600 illustrated in FIGS. 4, 5 and 6 correspond to components 400A, 500A and 600A illustrated in FIGS. 4A, 5A and 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. The computer-readable medium may be non-transitory computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   receiving, by a user equipment (UE), a signal associated with a downlink control channel, the signal comprising at least one parameter that is specific to the UE to indicate at least a rank of the UE; and
   determining, at the UE, based on the at least one parameter, a UE-specific reference signal (RS) pattern from a plurality of UE-specific RS patterns.

2. The method of claim 1, wherein the signal further comprises an indication of the UE-specific RS pattern.

3. The method of claim 1, wherein the at least one parameter further indicates a total rank of a plurality of UEs.

4. The method of claim 1, wherein the determined UE-specific RS pattern indicates what resources are used for transmission of reference signals.

5. The method of claim 1, wherein the determined UE-specific RS pattern indicates what resources are used for transmission of data symbols.

6. An apparatus for wireless communications, comprising:
   means for receiving, by a user equipment (UE), a signal associated with a downlink control channel, the signal comprising at least one parameter that is specific to the UE to indicate at least a rank of the UE; and
   means for determining, at the UE, based on the at least one parameter, a UE-specific reference signal (RS) pattern from a plurality of UE-specific RS patterns.

7. The apparatus of claim 6, wherein the signal further comprises an indication of the UE-specific RS pattern.

8. The apparatus of claim 6, wherein the at least one parameter further indicates a total rank of a plurality of UEs.

9. The apparatus of claim 6, wherein the determined UE-specific RS pattern indicates what resources are used for transmission of reference signals.

10. The apparatus of claim 6, wherein the determined UE-specific RS pattern indicates what resources are used for transmission of data symbols.

11. An apparatus for wireless communications, comprising:
    a memory unit; and
    at least one processor coupled to the memory unit; the at least one processor being configured:
    to receive, by a user equipment (UE), a signal associated with a downlink control channel, the signal comprising at least one parameter that is specific to the UE to indicate at least a rank of the UE; and
    to determine, at the UE, based on the at least one parameter, a UE-specific reference signal (RS) pattern from a plurality of UE-specific RS patterns.

12. The apparatus of claim 11, wherein the signal further comprises an indication of the UE-specific RS pattern.

13. The apparatus of claim 11, wherein the at least one parameter further indicates a total rank of a plurality of UEs.

14. The apparatus of claim 11, wherein the determined UE-specific RS pattern indicates what resources are used for transmission of reference signals.

15. The apparatus of claim 11, wherein the determined UE-specific RS pattern indicates what resources are used for transmission of data symbols.

16. A computer-program product for wireless communications, comprising a computer readable medium having instructions stored thereon, the computer program product comprising:
    a non-transitory computer-readable medium having program code recorded thereon, the program code comprising:
    program code to receive, by a user equipment (UE), a signal associated with a downlink control channel, the signal comprising at least one parameter that is specific to the UE to indicate at least a rank of the UE; and
    program code to determine, at the UE, based on the at least one parameter, a UE-specific reference signal (RS) pattern from a plurality of UE-specific RS patterns.

17. The computer-program product of claim 16, wherein the signal further comprises an indication of the UE-specific RS pattern.

18. The computer-program product of claim 16, wherein the at least one parameter further indicates a total rank of a plurality of UEs.

19. The computer-program product of claim 16, wherein the determined UE-specific RS pattern indicates what resources are used for transmission of reference signals.

20. The computer-program product of claim 16, wherein the determined UE-specific RS pattern indicates what resources are used for transmission of data symbols.

* * * * *